US009367893B2

(12) United States Patent
Ihara (10) Patent No.: US 9,367,893 B2
(45) Date of Patent: Jun. 14, 2016

(54) DIAGNOSIS ASSISTANCE APPARATUS, METHOD AND PROGRAM (71) Applicant: FUJIFILM Corporation, Tokyo (JP)

(72) Inventor: Satoshi Ihara, Tokyo (JP)

(73) Assignee: FUJIFILM CORPORATION, Tokyo (JP)

(*) Notice: Subject to any disclaimer, the term of this patent is extended or adjusted under 35 U.S.C. 154(b) by 153 days.

(21) Appl. No.: 14/337,889

(22) Filed: Jul. 22, 2014

(65) Prior Publication Data

US 2015/0030226 A1 Jan. 29, 2015

(30) Foreign Application Priority Data

Jul. 26, 2013 (JP) ................................. 2013-155378

(51) Int. Cl.
*G06T 3/00* (2006.01)
*G06T 7/00* (2006.01)

(52) U.S. Cl.
CPC ............. *G06T 3/0068* (2013.01); *G06T 7/0081* (2013.01); *G06T 7/0093* (2013.01); *G06T 2207/10081* (2013.01); *G06T 2207/10088* (2013.01); *G06T 2207/20036* (2013.01); *G06T 2207/20072* (2013.01); *G06T 2207/20101* (2013.01); *G06T 2207/20128* (2013.01); *G06T 2207/20141* (2013.01); *G06T 2207/30028* (2013.01)

(58) Field of Classification Search
CPC ....... G06T 3/0068; G06T 5/50; G06T 7/0012; G06T 7/0081; G06T 7/0097; G06T 2207/20112; G06T 2207/20141; G06T 2207/30028; G06K 9/34; G06K 9/342; G06K 2209/05; G06K 2209/051; A61B 6/52; A61B 6/5205; A61B 6/5217; A61B 6/5258
See application file for complete search history.

(56) References Cited

U.S. PATENT DOCUMENTS

2002/0097320 A1* 7/2002 Zalis ............................... 348/65
2006/0157069 A1* 7/2006 Matsumoto .................... 128/898

(Continued)

FOREIGN PATENT DOCUMENTS

JP 2010-264232 A 11/2010 ............... A61B 6/03
JP 2012-187161 A 10/2012 ............... A61B 6/03

OTHER PUBLICATIONS

D. Rueckert et al., "Nonrigid Registration Using Free-Form Deformations: Application to Breast MR Images", IEEE transactions on Medical Imaging, vol. 18, No. 8, pp. 712-721, 1999.

*Primary Examiner* — Andrew W Johns
(74) *Attorney, Agent, or Firm* — McGinn IP Law Group, PLLC (57) ABSTRACT

A first-image and a second-image representing the same organ of the same subject imaged at the same time are obtained, and an organ-region is extracted from the first-image. The extracted organ-region is displayed on a display screen. An input of an air-region included in the first-image and an input of exceeding or lacking portion information representing that the air-region is a lacking portion or an exceeding portion of the organ are received, and the received air-region and the received exceeding or lacking portion information corresponding to the air-region are obtained, as correction information. Corresponding positions are matched with other between the first-image and the second-image. The organ-region extracted from the first-image is corrected based on the correction information. At least an air-region in the second-image located at a position corresponding to the air-region corresponding to the correction information is extracted, as a part of the organ-region in the second-image.

9 Claims, 5 Drawing Sheets

(56) References Cited

U.S. PATENT DOCUMENTS

| | | |
|---|---|---|
| 2007/0165924 A1* | 7/2007 | Nicponski .................... 382/128 |
| 2009/0097728 A1* | 4/2009 | Lee et al. ..................... 382/131 |
| 2009/0238431 A1 | 9/2009 | Peterson et al. ............. 382/131 |
| 2010/0033866 A1 | 2/2010 | Boutaghou et al. ............ 360/75 |
| 2012/0033866 A1* | 2/2012 | Masumoto et al. ........... 382/128 |
| 2012/0128219 A1* | 5/2012 | Pascal et al. .................. 382/128 |
| 2012/0230559 A1 | 9/2012 | Itai ................................ 382/128 |

* cited by examiner

DIAGNOSIS ASSISTANCE APPARATUS, METHOD AND PROGRAM

CROSS-REFERENCE TO RELATED APPLICATIONS

The present application claims priority under 35 U.S.C. §119 to Japanese Patent Application No. 2013-155378, filed on Jul. 26, 2013. The above application is hereby expressly incorporated by reference, in its entirety, into the present application.

BACKGROUND OF THE INVENTION

1. Field of the Invention

The present invention is appropriately applicable to medical fields, and relates to an apparatus, method and computer program for assisting a user in image-based diagnosis performed based on three-dimensional image data.

2. Description of the Related Art

In recent years, high quality three-dimensional image data became obtainable by an advance in modalities, such as a multi-slice CT (MDCT: Multi Detector Computer Tomography). In image-based diagnosis using such image data, not only a high definition tomographic image but also a virtual pseudo-three-dimensional image of a subject to be examined became used. Further, as disclosed in the specification of U.S. Patent Application Publication No. 2009/0238431 (Patent Document 1), an organ region is extracted from a three-dimensional image by using an image recognition technique. Therefore, a virtual pseudo-three-dimensional image became producible from a three-dimensional image in which a structure had been identified more clearly. The produced image is used also for planning or simulation before surgery and for navigation during surgery.

Here, in CT examination of a large intestine, when large intestinal contents are insufficiently removed from the large intestine, the large intestinal contents appear as a residue in a CT image. If the CT value of the residue and the CT value of the wall of the large intestine (or a polyp in the large intestine) are about the same, it is difficult to distinguish the wall of the large intestine and the residue from each other also in a tomographic image. As a technique for solving such a problem in CT examination of the large intestine, radiography is performed on a patient with two body positions of a supine position and a prone position in some cases. In radiography at two body positions of a supine position and a prone position, the phenomenon that a residue moves when a body position changes is utilized, for example, as disclosed in Japanese Unexamined Patent Publication No. 2012-187161 (Patent Document 2) and Japanese Unexamined Patent Publication No. 2010-264232 (Patent Document 3). Even if a part of the large intestine is not observable in one of the images because of the residue, it is possible to observe the part in the other image by reading corresponding positions in the images obtained by radiography at two body positions of a supine position and a prone position.

SUMMARY OF THE INVENTION

However, when radiography is performed on the large intestine or the like, which is composed of soft tissue, a part of the large intestine is deformed and flattened to be thin in the diameter direction of the large intestine in some cases. In such a case, if the method for automatically extracting an organ, as disclosed in Patent Document 1, is used, only a part of the large intestine, for example, only a part connected to one of the sides of the flattened part (for example, rectum side) is extracted, as the large intestine, by error. Therefore, the extracted large intestine lacks a part of the large intestine connected to the other side of the flattened part (for example, small intestine side) in some cases. Further, as an opposite case, a part of the small intestine is erroneously extracted as a part of the large intestine in some cases, because a boundary between the large intestine and an adjacent organ, such as the small intestine, is not sufficiently identifiable depending on the shape of the connection part between the large intestine and the adjacent organ.

When an organ is automatically extracted from plural three-dimensional images obtained by imaging the same tubular organ of the same patient at the same time, as in the supine position image and the prone position image, a risk of erroneous extraction caused by deformation of the organ, as described above, is high for all of the plural three-dimensional images. Therefore, in actual medical fields, after an organ is temporarily extracted from plural three-dimensional images, users, such as a radiologist and a radiologic technologist, visually check the extraction result on a display screen. If the users judge that the result includes erroneous extraction of the organ, they correct the extracted large intestine by manually inputting a lacking portion or an exceeding portion of the organ to all of the three-dimensional images, in which erroneous extraction occurred, while looking at the display screen.

It is an object of the present invention to reduce a burden of manually correcting an organ region for plural three-dimensional images by a user when doctors or the like extracts the organ region from the plural three-dimensional images that have been obtained by imaging the same tubular structure organ of the same patient at the same time. The present invention aims at reducing such burden on the user by providing an improved diagnosis assistance apparatus, method and program. It is also an object of the present invention to easily and accurately extract the organ region from plural three-dimensional images.

A diagnosis assistance apparatus of the present invention includes an image obtainment unit that obtains each of a first image and a second image obtained by imaging a region including the same tubular structure organ of the same subject at the same time, an organ region extraction unit that extracts an organ region of the organ from the first image, a display control unit that makes the extracted organ region displayed on a display screen, a correction information obtainment unit that receives an input of an air region included in the first image and an input of exceeding or lacking portion information representing that the air region is a lacking portion or an exceeding portion of the organ, and obtains the received air region and the received exceeding or lacking portion information corresponding to the air region, as correction information, and a position matching unit (registration unit) that calculates position-matching information (registration information) that correlates corresponding positions to each other between the first image and the second image. Further, the organ region extraction unit corrects, based on the correction information, the organ region extracted from the first image by adding a portion corresponding to the lacking portion or by deleting the exceeding portion, and extracts, based on the position-matching information, at least an air region in the second image located at a position corresponding to the air region corresponding to the correction information, as a part of the organ region in the second image.

A diagnosis assistance method of the present invention is an organ extraction method performed by a diagnosis assistance apparatus. The diagnosis assistance method includes an image obtainment step of obtaining each of a first image and a second image obtained by imaging a region including the same tubular structure organ of the same subject at the same time, an organ region extraction step of extracting an organ region of the organ from the first image, a display control step of making the extracted organ region displayed on a display screen, a correction information obtainment step of receiving an input of an air region included in the first image and an input of exceeding or lacking portion information representing that the air region is a lacking portion or an exceeding portion of the organ, and obtaining the received air region and the received exceeding or lacking portion information corresponding to the air region, as correction information, a position matching step of calculating position-matching information that correlates corresponding positions to each other between the first image and the second image, a correction step of correcting, based on the correction information, the organ region extracted from the first image by adding a portion corresponding to the lacking portion or by deleting the exceeding portion, and an extraction step of extracting, based on the position-matching information, at least an air region in the second image located at a position corresponding to the air region corresponding to the correction information, as a part of the organ region in the second image.

A diagnosis assistance program of the present invention causes a computer to perform the aforementioned diagnosis assistance method.

The term "same time" means an examination period during which plural examinations are performed for the same diagnosis. For example, the same time is typically considered to be the same day, but the same time may be a few days or one or two weeks.

In the diagnosis assistance apparatus of the present invention, it is desirable that the organ region extraction unit extracts, based on the position-matching information, an air region in the second image located at a position corresponding to the corrected organ region, as the organ region in the second image.

In the diagnosis assistance apparatus of the present invention, the position matching unit may use an arbitrary method that can match corresponding positions with each other between the first image and the second image. For example, the position matching unit may match corresponding positions with each other between the first image and the second image by using a non-rigid registration method. Further, the organ region extraction unit may obtain plural air regions from the second image, and extract at least one of the plural air regions in the second image, each including a region overlapping, by a predetermined ratio or higher, with the corrected organ region in the first image when corresponding positions are matched with each other between the first image and the second image based on the position-matching information, as the organ region in the second image.

Further, in the diagnosis assistance apparatus of the present invention, the position matching unit may generate a first graph structure representing the corrected organ region, and which is defined by plural nodes and at least one edge connecting the plural nodes, and obtain plural air regions included in the second image, and generate plural second graph structures representing the plural air regions in the second image, respectively, and each of which is defined by plural nodes and at least one edge connecting the plural nodes. Further, the organ region extraction unit may identify at least one of the plural second graph structures in which a predetermined ratio or higher of the plural nodes constituting each of the plural second graph structures is located at a position or positions corresponding to a node or nodes included in the first graph structure, and extract at least one of the air regions corresponding to the identified at least one of the plural second graph structures, as the organ region in the second image.

In the diagnosis assistance apparatus of the present invention, it is desirable that the display control unit obtains the air region in the first image, and makes the first image displayed on a display screen in such a manner that the extracted organ region and the air region in the first image are distinguishable from each other.

In the diagnosis assistance apparatus of the present invention, it is desirable that the correction information obtainment unit receives specification of a position in an air region included in the first image, and obtains, as the air region, a continuous air region including the specified position.

Further, the organ in the present invention may be various kinds of organ with a tubular structure. It is desirable that the organ of the present invention is, for example, intestines. For example, the large intestine, the small intestine, the duodenum, the rectum and the like are desirable, and the large intestine is most desirable.

According to the diagnosis assistance apparatus, method and program of the present invention, each of a first image and a second image obtained by imaging a region including the same tubular structure organ of the same subject at the same time are obtained. An organ region of the organ is extracted from the first image. The extracted organ region is displayed on a display screen. An input of an air region included in the first image and an input of exceeding or lacking portion information representing that the air region is a lacking portion or an exceeding portion of the organ are received. The received air region and the received exceeding or lacking portion information corresponding to the air region are obtained, as correction information. Positions are matched with each other by calculating position-matching information that correlates corresponding positions to each other between the first image and the second image. Further, the organ region extracted from the first image is corrected, based on the correction information, by adding a portion corresponding to the lacking portion or by deleting the exceeding portion. Further, at least an air region in the second image located at a position corresponding to the air region corresponding to the correction information is extracted, based on the position-matching information, as a part of the organ region in the second image. Therefore, erroneous extraction occurred at a position in the first image does not occur at a corresponding position in the second image. Hence, a user only needs to perform manual correction on the organ only in the first image, and does not need to perform manual correction on the same position of the organ region in the second image. In this way, it is possible to easily and accurately extract the organ from plural three-dimensional images.

Further, when an air region in the second image located at a position corresponding to the corrected organ region is extracted, based on the position-matching information, as the organ region in the second image, a user can extract an organ region in the second image corresponding to the organ region in the first image that reflects correction performed on a region having a risk of erroneous extraction. Therefore, it is possible to reduce erroneous extraction caused by deformation of the organ in the second image, and to easily and accurately extract the organ from the second image.

Note that the program of the present invention may be provided being recorded on a computer readable medium. Those who are skilled in the art would know that computer readable media are not limited to any specific type of device, and include, but are not limited to: floppy disks, CD's, ROM's, hard disks, magnetic tapes, and Internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Hereinafter, embodiments of a diagnosis assistance apparatus, method and program of the present invention will be described in detail with reference to drawings. In diagrams, the same signs will be assigned to corresponding elements.

In each of the following embodiments, a diagnosis assistance apparatus is a computer in which a diagnosis assistance program of each embodiment has been installed. The computer may be a workstation or a personal computer directly operated by a doctor in charge of diagnosis, or a server computer connected to them through a network. The diagnosis assistance program is stored in a recording medium, such as a DVD and CD-ROM, and distributed, and installed in a computer from the recording medium. Alternatively, the diagnosis assistance program may be stored in a recording apparatus of a server computer connected to the network or a network storage in such a manner to be accessible from the outside, and downloaded in a computer used by a doctor by a request, and installed in the computer.

Figure 1:
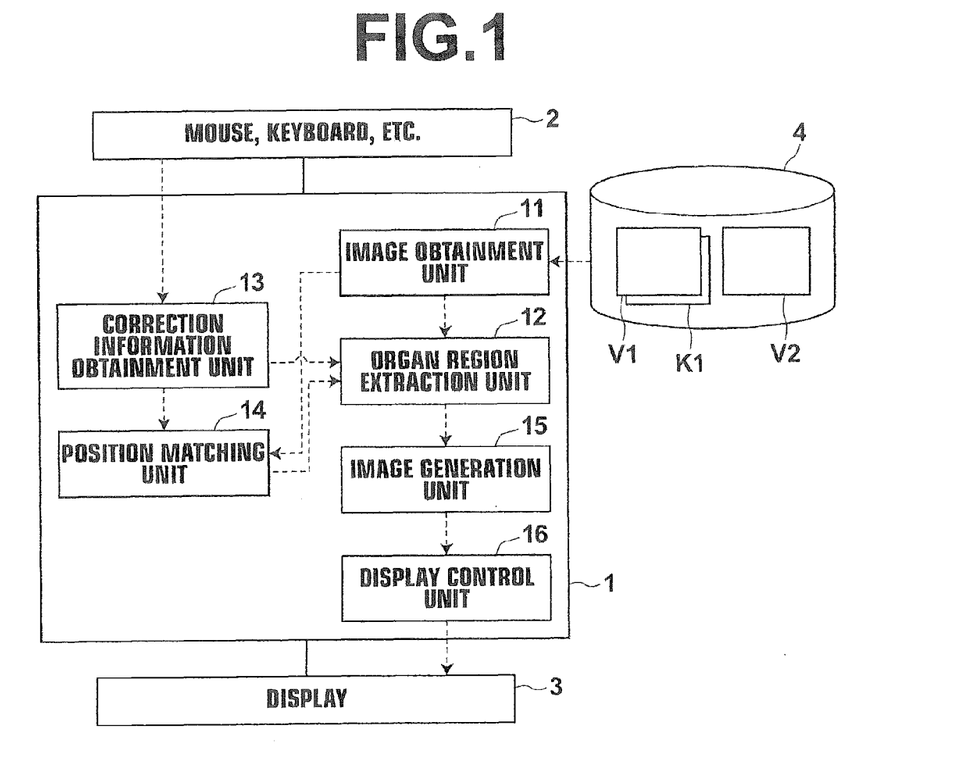
FIG. 1 is a schematic diagram illustrating the configuration of a diagnosis assistance apparatus according to an embodiment of the present invention.

FIG. 1 is a schematic diagram illustrating the configuration of a diagnosis assistance apparatus realized by installing a diagnosis assistance program in a workstation. As illustrated in FIG. 1, a diagnosis assistance apparatus 1 has a standard workstation configuration, which includes a CPU (not illustrated) and a memory (not illustrated). The diagnosis assistance apparatus 1 includes a storage unit 4. Further, a display 3 and an input device 2, such as a mouse, are connected to the diagnosis assistance apparatus 1.

Volume data (including at least first image V1 and second image V2, which are a supine position image and a prone position image obtained by imaging the abdomen of the same patient on the same day) obtained by reconstructing slice data output from a tomography apparatus, such as a CT (Computed Tomography) apparatus and MRI (Magnetic Resonance Imaging) apparatus, are stored in the storage unit 4. Further, each image data (for example, volume data about only air regions extracted by analyzing first image V1 and second image V2, or data about a volume rendering image displayed on a display screen) obtained during diagnosis assistance processing according to an embodiment of the present invention, or the like is appropriately stored in the storage unit 4.

The diagnosis assistance program is stored in the memory. The diagnosis assistance program defines image obtainment processing, organ extraction processing, display control processing, correction information obtainment processing, position matching processing and image generation processing, as processing performed by the CPU. When the CPU executes these kinds of processing in accordance with the program, a general-purpose workstation functions as an image obtainment unit 11, an organ region extraction unit 12, a display control unit 16, a correction information obtainment unit 13, a position matching unit 14, and an image generation unit 15. The image obtainment unit 11 obtains each of a first image (first image V1) and a second image (second image V2) obtained by imaging a region including the same tubular structure organ (the large intestine and the rectum) of the same subject at the same time. The organ region extraction unit 12 extracts an organ region of the organ from the first image. The display control unit 16 makes the extracted organ region displayed on a display screen. The correction information obtainment unit 13 receives an input of an air region included in first image V1 and an input of exceeding or lacking portion information representing that the air region is a lacking portion or an exceeding portion of the organ, and obtains the received air region and the received exceeding or lacking portion information corresponding to the air region, as correction information. The position matching unit 14 calculates position-matching information that correlates corresponding positions to each other between first image V1 and second image V2. The image processing unit 15 appropriately generates a reconstruction image, such as volume rendering image, from volume data, such as first image V1 and second image V2.

A flow of processing of the diagnosis assistance apparatus 1 according to an embodiment of the present invention will be described with reference to the flow chart of FIG. 2. Here, the diagnosis assistance apparatus 1 according to the embodiment of the present invention provides plural diagnosis assistance functions based on the kind of living body tissue of a tubular structure (the large intestine, the small intestine, the duodenum, the rectum or the like) to be diagnosed. Here, a flow of processing when a diagnosis assistance function for the large intestine and the rectum, as an extraction-target organ region, has been selected will be described, as an example. In the following descriptions, a region composed of the large intestine region and the rectum region will be referred to as an organ region.

First, a diagnosis assistance function for the large intestine is called by selection from a selection menu, and data files of first image V1 and second image V2 to be diagnosed are selected. Then, the image obtainment unit 11 loads the selected first image V1 and second image V2 from the storage unit 4 into the memory (S01).

Next, the organ region extraction unit 12 performs judgment on first image V1 by using a threshold, and obtains a region with CT values of 800 or less, as an air region (S02). Then, a region of an organ enclosing air (the lungs, the stomach, the duodenum, the small intestine, the large intestine, the rectum or the like) is obtained, as an air region (please refer to A1 through A8 in FIG. 3A), from first image V1. Here, the organ region extraction unit 12 may use an arbitrary method that can extract an air region.

Figure 3A:
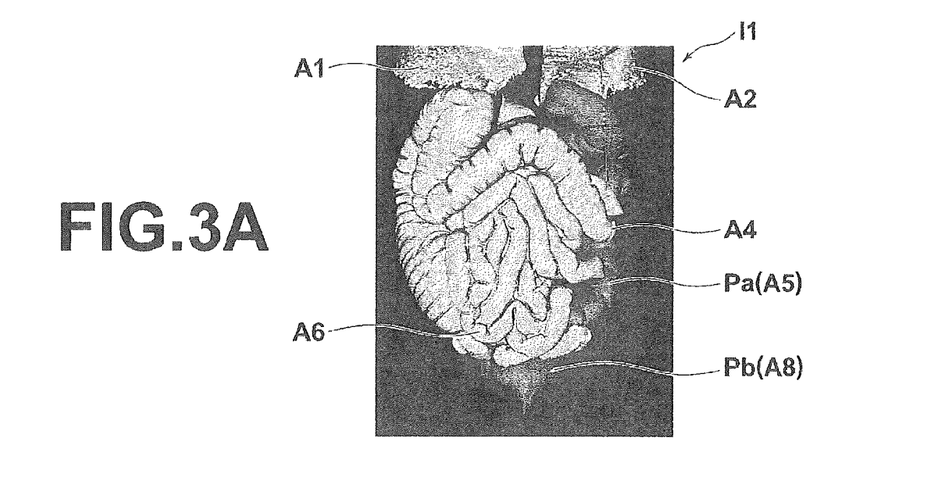
FIG. 3A is a diagram illustrating an example of a display screen on which an extracted large intestine is displayed.

Next, the organ region extraction unit 12 obtains an organ region that has been automatically extracted from first image V1 (S03). An arbitrary automatic extraction method that can extract an organ region may be adopted to automatically extract the organ region. Here, it is assumed that the extraction method disclosed in Patent Document 3 is adopted. FIG. 3A is a diagram illustrating an example of an extraction result (including erroneous extraction) of automatic extraction of an organ region from first image V1. In the example illustrated in FIG. 3A, regions corresponding to air regions A5, A8 are automatically extracted, as organ regions Pa, Pb, from first image V1. Meanwhile, although a region corresponding to air region A4 is a part of the large intestine region, the region corresponding to air region A4 is not recognized as an organ region. That is because a part of the large intestine (a part corresponding to a connection part between air region A4 and air region A5) is deformed and flattened in the diameter direction, and the part is temporarily obstructed. In automatic extraction, the obstructed deformed part is erroneously judged to be a terminal end of the large intestine region. Therefore, air region A4 corresponding to a part of the large intestine on the small intestine side of the deformed part, and which is connected to the small intestine, is not recognized as a part of the large intestine region. Therefore, the air region A4 constitutes a lacking portion of the organ region. On the other hand, when the connection part between the large intestine region and the small intestine region is open in the diameter direction, a part of the small intestine or the like is erroneously detected as the organ region, and constitutes an exceeding portion of the organ region in some cases.

Next, the image generation unit 15 generates volume rendering image I1 showing air regions (please refer to A1 through A8 in FIG. 3A) extracted from first image V1 and regions (please refer to Pa, Pb in FIG. 3A) extracted, as organ regions, from first image (S04). The display control unit 16 sends an instruction for displaying the generated volume rendering image I1 on a display screen of the display 3 (S05). In volume rendering image I1, regions Pa, Pb, which have been extracted as organ regions, and air regions (please refer to A1, A2, A4, A6 and the like in FIG. 3A), which have been extracted from first image V1, are displayed in such a manner that they are distinguishable from each other. As a method for distinguishably displaying air regions and organ regions, any known method may be adopted. Here, organ regions Pa, Pb and air regions A1, A2, A3, A4, A6 and A7 (A3, A7 are not illustrated in FIG. 3A) other than the organ regions are colored in different colors so that the organ regions and the air regions are distinguishable from each other, and displayed. Therefore, a user, such as a doctor, who has knowledge on the outer form of the large intestine can identify the lacking portion and the exceeding portion of the large intestine region, by intuition, through observation on the display screen.

The correction information obtainment unit 13 receives an input of correction information by the user while volume rendering image I1, as illustrated in FIG. 3A, is displayed on the display screen. The volume rendering image I1 shows regions Pa, Pb, which have been extracted as organ regions, and air regions A1, A2, A3, A4, A6 and A7. When an input of instruction for correction is detected (S06, Y), correction information is obtained based on the instruction (S07).

For example, when the user inputs, by a mouse, an arbitrary position in air region A4 that has been judged to be included in an organ region with reference to displayed volume rendering image I1, the correction information obtainment unit 13 receives air region A4 including the input position by using a region growing method. As a method for specifying an air region, an arbitrary known method may be adopted.

Next, a dialogue box for prompting selection as to whether the obtained air region A4 should be added to the organ region or excluded from the organ region is displayed on the display screen. When an instruction for adding the specified air region A4 to the large intestine is selected, the correction information obtainment unit 13 obtains, as correction information, air region A4 and exceeding or lacking portion information representing that the air region A4 is a lacking portion of the large intestine, and stores the correction information in the storage unit 4. On the other hand, when an instruction for deleting the specified air region A4 from the large intestine is selected, the correction information obtainment unit 13 obtains, as correction information, air region A4 and exceeding or lacking portion information representing that the air region A4 is an exceeding portion of the large intestine, and stores the correction information in the storage unit 4. Here, when plural air regions are specified, the correction information obtainment unit 13 obtains exceeding or lacking portion information for each of the obtained plural air regions, and stores correction information for each of the obtained air regions.

Figure 3B:
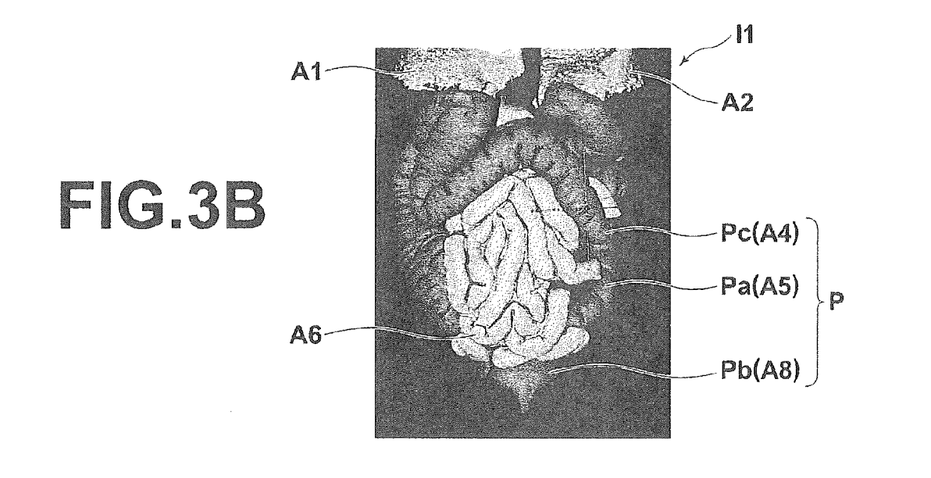
FIG. 3B is a diagram illustrating an example of a display screen on which a corrected large intestine is displayed.

Next, the organ region extraction unit 12 obtains correction information. If air region A4 in the correction information is a lacking portion of the large intestine, a portion corresponding to the lacking portion is added to the region that has been extracted as the organ region of first image V1. If air region A4 in the correction information is an exceeding portion of the large intestine, the exceeding portion is deleted from the region that has been extracted as the organ region. Accordingly, corrected organ region P is obtained (S08). For example, in the example of FIG. 3A, correction information representing that air region A3 is a lacking portion of the organ region has been obtained. Therefore, the organ region extraction unit 12 adds, as organ region Pc, air region A4 obtained based on the correction information to the automatically extracted organ regions Pa, Pb. The organ region extraction unit 12 updates organ region P, as a region composed of organ regions Pa, Pb, Pc, and stores the organ region P. Further, the image generation unit 15 generates volume rendering image I1 in which air region A4 is colored in the same color as the color of organ regions Pa, Pb. As illustrated in 3B, the generated volume rendering image I1, which represents the corrected organ region, is displayed by the display control unit 16.

Next, the position matching unit 14 matches corresponding positions with each other between first image V1 and second image V2 by using a non-rigid registration method (S09). The position matching unit 14 sets a deformation amount for each voxel in first image V1. While the position matching unit 14 gradually changes the deformation amount of each voxel, the position matching unit 14 maximizes (minimizes) a predetermined function representing the degree of similarity of a deformed image of first image V1 that has been deformed based on the deformation amount of each voxel to second image V2. Accordingly, the position matching unit 14 obtains position-matching information F (deformation information) that defines the deformation amount of each voxel of first image V1 when corresponding positions are matched with each other between first image V1 and second image V2.

In the non-rigid registration method, a predetermined function for judging the degree of similarity between two images is maximized (minimized) by moving voxels in one of the two images based on the deformation amounts of respective voxels. Accordingly, the deformation amount of each voxel in the one of the two images for making the two images match with each other is calculated. Various known methods may be applied to the embodiment of the present invention as long as the methods are non-rigid registration methods for making the positions of two images match with each other. For example, D. Rueckert et al., "Nonrigid Registration Using Free-Form Deformations: Application to Breast MR Images", IEEE transactions on Medical Imaging, Vol. 18, No. 8, pp. 712-721, 1999 may be applied to the embodiment of the present invention.

Figure 4A:
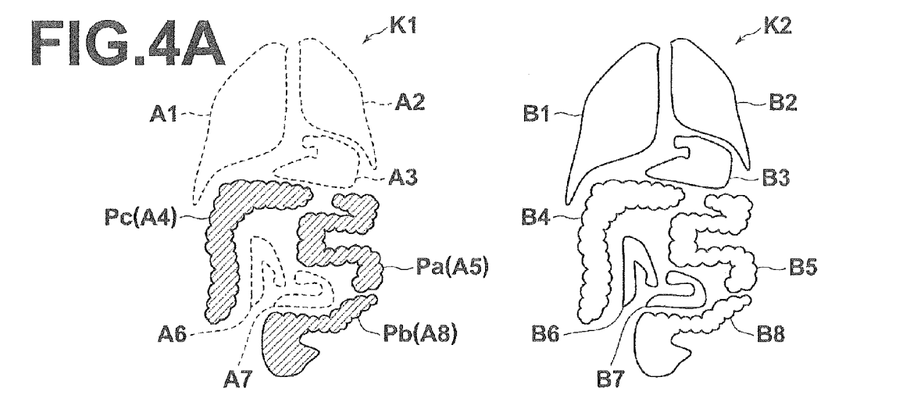
FIG. 4A is a diagram illustrating processing for extracting an organ region in a second image according to a first embodiment (No. 1)
Figure 4B:
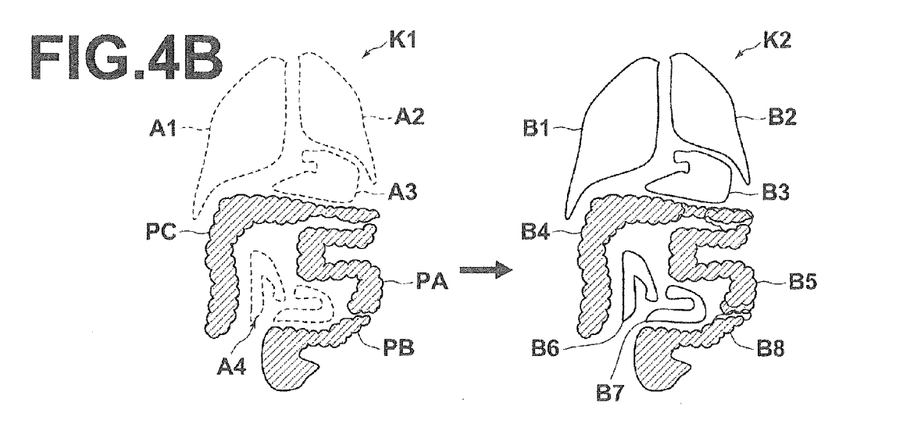
FIG. 4B is a diagram illustrating processing for extracting the organ region in the second image according to the first embodiment (No. 2)
Figure 4C:
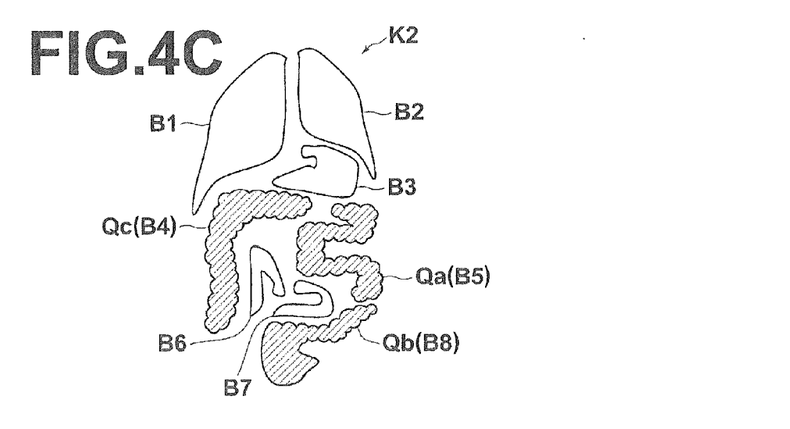
FIG. 4C is a diagram illustrating processing for extracting the organ region in the second image according to the first embodiment (No. 3)

Next, a method for extracting organ region Q from second image V2 by the organ region extraction unit 12 will be described. FIGS. 4A through 4C are diagrams for explaining a method for extracting the large intestine from second image V2. In FIG. 4A, Section K1 illustrates organ regions Pa, Pb, Pc extracted from first image V1 and air regions A1, A2, A3, A6 and A7 other than organ region P in first image V1. In FIG. 4A, Section K2 illustrates air regions B1 through B8 in second image V2.

First, the organ region extraction unit 12 extracts air regions from second image V2 by using the same method as the method for extracting air regions from first image V1. The organ region extraction unit 12 obtains eight air regions of B1 through B8 corresponding to the lung, the stomach, the large intestine, the small intestine, the rectum, and the like, which have been extracted from second image V2, and assigns labels to the air regions, respectively.

Further, the organ region extraction unit 12 obtains a mask image (an image representing organ regions Pa, Pb, Pc, indicated by shadows in FIG. 4A, Section K1), which has extracted only organ region P from first image V1. Further, as illustrated in FIG. 4B, Section K1, the organ region extraction unit 12 deforms voxels included in organ region P (Pa, Pb, Pc) in the mask image based on position-matching information F. The voxels included in organ region P in first image V1 are deformed based on deformation amounts corresponding to the voxels. Accordingly, the organ region extraction unit 12 obtains deformed organ regions PA, PB, PC.

Next, the organ region extraction unit 12 calculates the ratio of an overlapping region in which an air region and an organ region in the mask region overlap with each other for each of air regions B1 through B8 in second image V2. Then, the organ region extraction unit 12 determines at least one of the plural air regions B1 through B8 having a predetermined value or higher of ratio of an overlapping region (for example, 50% or higher), as organ region Q in second image V2. FIG. 4B, Section K2 illustrates a state in which corresponding positions are matched with each other between a deformed mask image and second image V2. FIG. 4B shows that air regions B4, B5, B8 in second image V2 have a large ratio of overlapping with shadow regions corresponding to deformed organ regions PA, PB, PC in the mask image. Therefore, As illustrated in FIG. 4C, the organ region extraction unit 12 extracts air regions B4, B5, B8, as organ regions Qc, Qa, Qb in second image V2. Accordingly, organ region Q in second image V2, which is composed of organ regions Qc, Qa, Qb, is extracted.

As in the embodiment of the present invention, when plural images are obtained by imaging the same tubular structure organ of the same subject at the same time, like a supine position image (first image V1) and a prone position image (second image V2) of the same subject imaged at the same time (here, on the same day), a probability of occurrence of common organ deformation in the same part of the organ in all of the plural images is high. Therefore, when erroneous extraction caused by deformation of an organ has occurred in one of the plural images, the probability that erroneous extraction caused by deformation of the organ at the same position will occur also in the other image or images is extremely high. Especially, when the modalities of the plural images are the same, or when the same organ extraction method is applied to plural images, this problem is more noticeable.

As in the aforementioned embodiment of the present invention, when at least an air region in second image V2 located at the same position as an air region in first image V1 corresponding to correction information is extracted, based on the correction information about first image V1, as a part of an organ region, it is possible to appropriately avoid erroneous extraction of an organ region in second image V2, which may be caused by the cause of erroneous extraction in first image V1 (deformation at a corresponding position in the organ). Further, when an air region in second image V2 located at a position corresponding to corrected organ region P in first image V1 is extracted as organ region Q, it is possible to extract organ region Q in second image V2 corresponding to organ region P in first image V1 in which a region with a risk of erroneous extraction has been appropriately corrected. Therefore, it is possible to reduce occurrence of erroneous extraction caused by deformation of an organ with respect to second image V2. Further, it is possible to easily and accurately extract the organ from second image V2.

Further, the following method may be adopted to obtain a similar effect. Specifically, processing for automatically extracting an organ region is performed on both of first image V1 and second image V2, and information for correcting an organ region for first image V1 is obtained. Further, correction is performed on the extraction result of second image V2 by adding an air region of second image V2 that corresponds to an air region corresponding to correction information about first image V1, or by deleting an air region of second image V2 that corresponds to correction information about first image V1. Here, for the purpose of simplifying processing, it is desirable that the organ region extraction unit 12 extracts, based on position-matching information F, an air region in second image V2 located at a position corresponding to corrected organ region P, as organ region Q, as in the aforementioned embodiment.

Further, as in the aforementioned embodiment, the position matching unit 14 may match corresponding positions with each other between first image V1 and second image V2 by using a non-rigid registration method. Further, the organ region extraction unit 12 may obtain plural air regions B1 through B8 from second image V2. When the organ region extraction unit 12 has extracted, as organ region Q in second image V2, air regions B4, B5, B8 in second image V2 each of which overlaps, by a predetermined ratio or higher, with corrected organ region P in first image V1 while corresponding positions are matched with each other between first image V1 and second image V2 based on position-matching information F, it is possible to easily and accurately extract the organ region of second image V2. The present invention is not limited to the aforementioned embodiments, and any method may be adopted as long as the method obtains an air region in second image V2 including a region overlapping, by a predetermined ratio or higher, with a corrected organ region in first image V1 when corresponding positions are matched with each other between first image V1 and second image V2 based on position-matching information.

As in the aforementioned embodiments, when the display control unit 16 obtains air regions A1 through A8 in first image V1, and makes first image V1 displayed on the display screen in such a manner that organ regions Qa, Qb that have been automatically extracted and air regions (please refer to A1, A2, A3, A4, A6, A7 in FIG. 4A) other than organ regions Qa, Qb, which have been automatically extracted, in first image V1 are distinguishable from each other, a doctor who makes a diagnosis can efficiently recognize the result of extraction of an organ and an air region in first image V1 on the display screen. Next, the doctor may flexibly specify an air region that needs to be especially corrected in the images, and easily correct the specified air region by adding the air region to an organ region or by deleting the air region from the organ region. An arbitrary distinguishable display method may be adopted as long as an automatically extracted organ region and an air region other than the organ region are distinguishable. Here, an image constructed by using an arbitrary reconstruction method based on volume data, such as a surface rendering method, may be displayed on the display screen.

Further, the correction information obtainment unit 13 receives specification of a position in an air region included in first image V1, and obtains, as an air region, a continuous air region including the specified position. Therefore, a user can easily specify an air region that is a lacking portion or an exceeding portion of an organ region in first image V1 just by specifying a desirable position in the air region. As a method for manually specifying an air region, any known method may be used.

The present invention is not limited to the aforementioned embodiments. In the diagnosis assistance apparatus, the position matching unit 14 may use an arbitrary method that can match corresponding positions between first image V1 and second image V2. Any known method for extracting organ region Q in second image V2 located at a position corresponding to organ region P in first image V1 may be adopted.

Figure 5A:
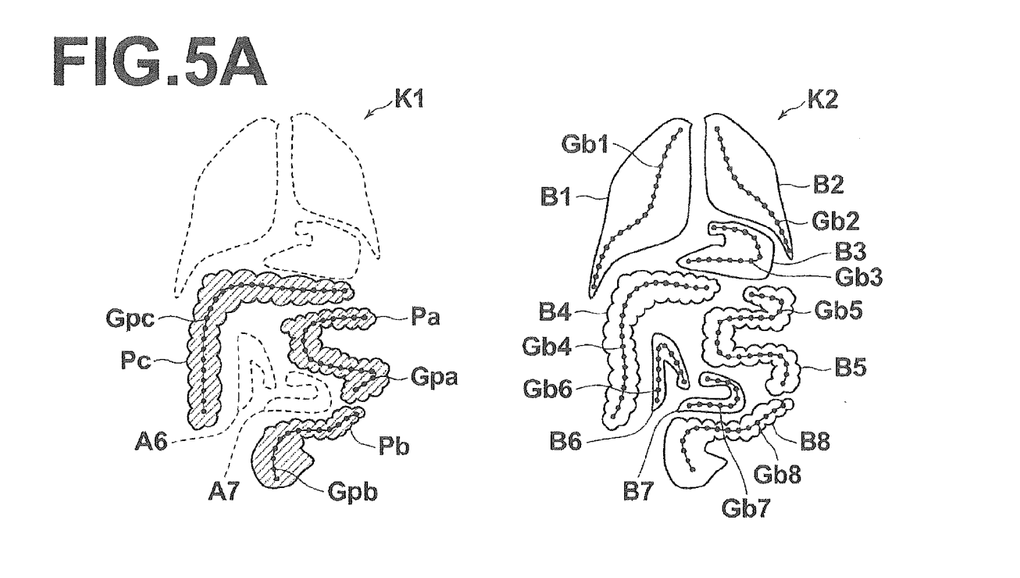
FIG. 5A is a diagram illustrating processing for extracting the organ region in the second image according to a second embodiment (No. 1)
Figure 5B:
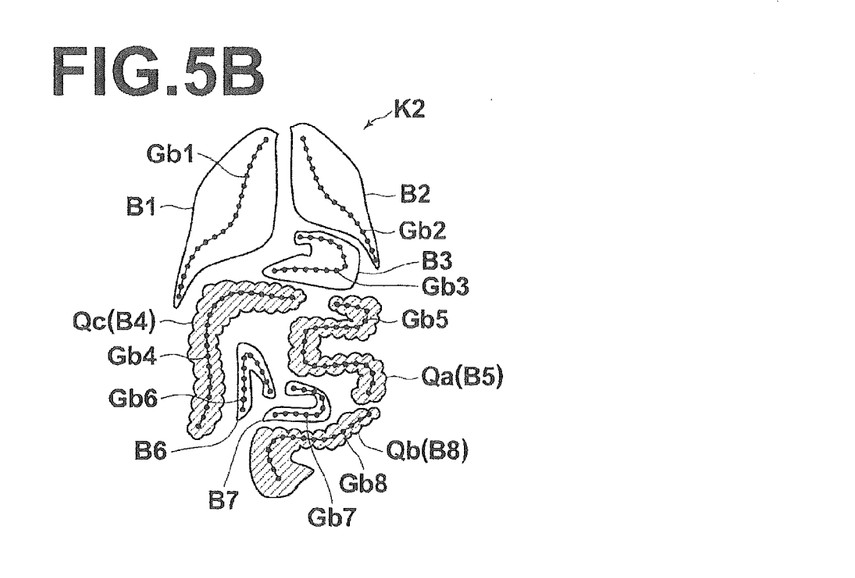
FIG. 5B is a diagram illustrating processing for extracting the organ region in the second image according to the second embodiment (No. 2).

In a second embodiment, an example in which organ region Q in second image V2 located at a position corresponding to organ region P in first image V1 is extracted by using a different position matching method will be described. FIG. 5A is a diagram explaining processing for representing organ region P in first image V1 by a graph and processing for representing air regions B1 through B8 in second image V2 by a graph. FIG. 5B is a diagram explaining processing for extracting an organ region from second image V2.

Figure 2:
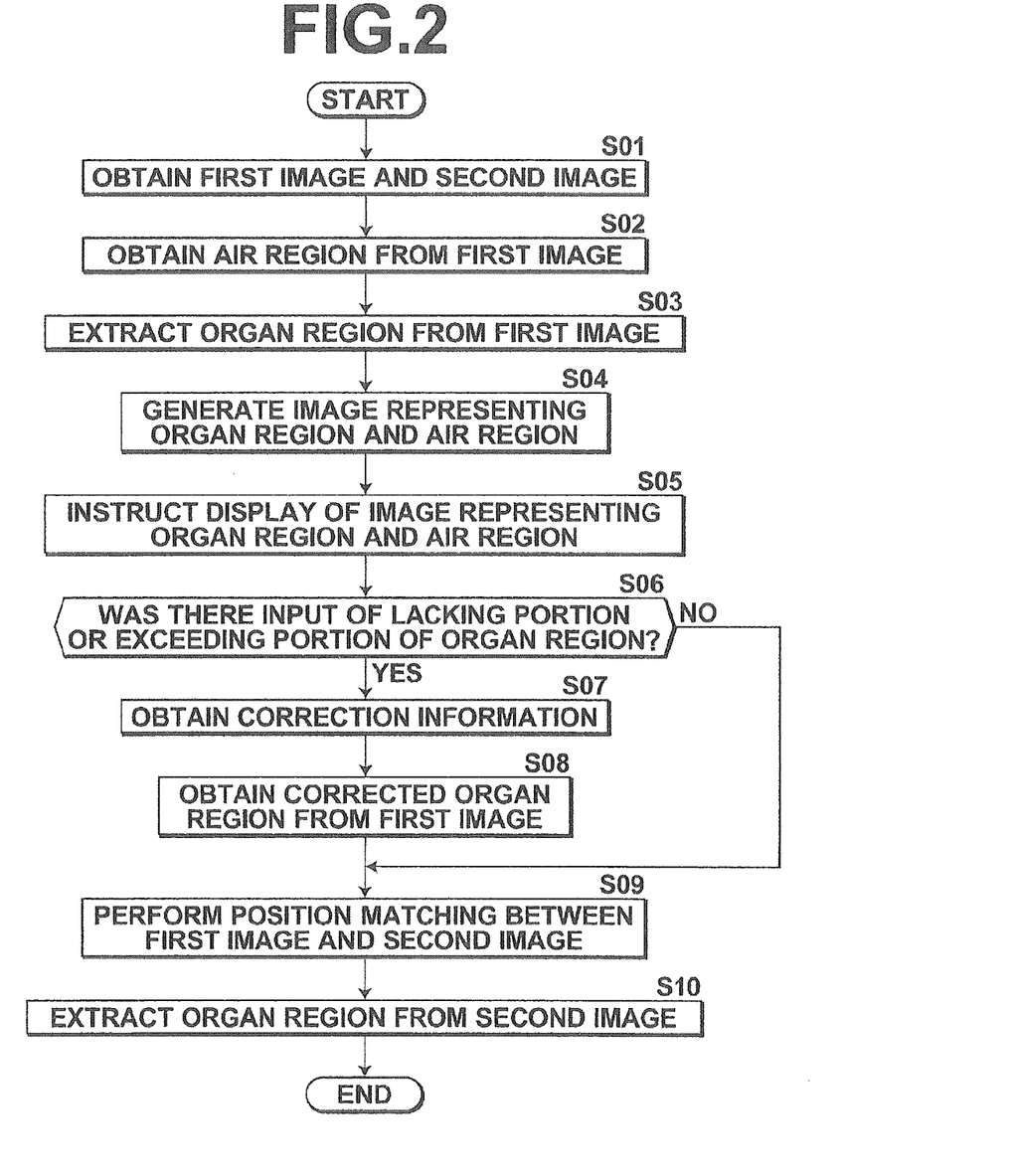
FIG. 2 is flow chart illustrating a flow of diagnosis assistance processing according to an embodiment of the present invention.

In the second embodiment, only position matching processing by the position matching unit 14 in S09 illustrated in FIG. 2 and processing for extracting an organ from second image V2 in S10 illustrated in FIG. 2 differ from the first embodiment. Regarding the other processing, the function of each unit and processing are same as those of the first embodiment. Therefore, in the second embodiment, the part different from the first embodiment will be mainly described. Descriptions about processing common to the first embodiment and the second embodiment will be omitted to avoid repeating explanations.

In the second embodiment, first, the diagnosis assistance apparatus 1 performs processing similar to S01 through S08 illustrated in FIG. 2. Next, the position matching unit 14 enlarges or reduces, moves or the like the coordinate system of first image V1 and the coordinate system of second image V2 relative to each other by using a known method, as processing corresponding to position matching processing in the first embodiment (S09 in FIG. 2) Accordingly, the position matching unit 14 obtains position-matching information that correlates coordinates representing corresponding positions to each other.

Next, the organ region extraction unit 12 performs the following processing, as processing corresponding to processing for extracting an organ region from second image V2 (S10) in the first embodiment. First, the organ region extraction unit 12 creates a first graph structure (Gpa, Gpb, Gpc in FIG. 5A) representing corrected organ region P (Pa, Pb, Pc), and which is defined by plural nodes and at least one edge connecting the nodes. Here, thinning is performed on organ regions Pa, Pb, Pc, and a segment corresponding to a core line of the organ region is extracted. Further, ends of the segment are defined as nodes, and a node dividing the segment with predetermined intervals is defined. Further, the divided segments are defined as plural edges. Accordingly, first graph structures Gpa, Gpb, Gpc representing segments are generated.

Further, the organ region extraction unit 12 obtains plural air regions (B1 through B8 in FIG. 5A) included in second image V2, and creates plural second graph structures (Gb1 through Gb8 in FIG. 5B) representing plural air regions in second image V2, respectively, and which are defined by plural nodes and at least one edge connecting the nodes. Here, thinning is performed on air regions (B1 through B8 in FIG. 5A), and a segment corresponding to a core line of the air region is extracted. Further, ends of the segment are defined as nodes, and a node dividing the segment with predetermined intervals is defined. Further, the divided segments are defined as plural edges. Accordingly, second graph structures Gb1 through Gb8 representing segments are generated. Further, the organ region extraction unit 12 stores the generated second graph structures (Gb1 through Gb8) in the storage unit 4 in such a manner that the second graph structures are related to corresponding regions (regions before thinning) in the process of creating the second graph structures.

Then, with respect to each of the second graph structures (Gb1 through Gb8 in FIG. 5A), the organ region extraction unit 12 calculates, based on position-matching information, the ratio of a node or nodes that constitute each of the second graph structures and are located at a position or positions corresponding to a node or nodes included in the first graph structure to all nodes in the second graph structure. Further, a second graph structure or structures in which the calculated ratio is higher than or equal to a predetermined ratio are identified. Further, the organ region extraction unit 12 extracts an air region or regions corresponding to the identified graph structure or structures, as an organ region in second image V2.

In the example illustrated in FIG. 5A, second graph structure Gb4, which includes a predetermined ratio or higher of nodes located at positions corresponding to nodes included in first graph structure Gpc, is identified. Similarly, second graph structures Gb5, Gb8, each including a predetermined ratio or higher (for example, 50% or higher) of nodes located at positions corresponding to nodes included in first graph structure Gpa, Gpb, respectively, are identified. The identified second graph structures Gb4, Gb5, Gb8 are distinguished, as graph structures corresponding to the organ region. Further, as illustrated in FIG. 5B, the organ region extraction unit 12 extracts air regions B4, B5, B8 corresponding to second graph structures Gb4, Gb5, Gb8, which correspond to the organ region, as organ region Q (Qc, Qa, Qb).

As in the second embodiment, second graph structures Gb4, Gb5, Gb8 representing air regions in second image V2, and each including a predetermined ratio or higher of nodes located at positions corresponding to nodes included in first graph structures Gpa through Gpc representing organ regions Pa through Pc in first image V1, may be identified. Further, air regions B4, B5, B8 corresponding to identified second graph structures Gb4, Gb5, Gb8 may be extracted, as organ region Q (Qc, Qa, Qb). Also in such a case, it is possible to appropriately extract air regions in second image V2 located at positions corresponding to organ region P in first image V1. Further, it is possible to accurately and easily extract the organ region in second image V2. Further, in the embodiment of the present invention, any method for identifying a second graph structure including a predetermined ratio or higher of nodes located at positions corresponding to nodes in the first graph structure may be adopted.

Processing for matching corresponding positions between first image V1 and second image V2 illustrated in S09 in each of the aforementioned embodiments may be performed in arbitrary timing as long as the processing is performed before processing for extracting an organ from second image V2 (S10).

Further, even when there are three or more three-dimensional images obtained by imaging the same tubular organ of the same patient at the same time, a series of processing till obtainment of correction information illustrated in S01 through S08 may be performed on one of the three-dimensional images (first image V1), and processing in S09, 510 may be performed on other three-dimensional images (second image V2). Accordingly, the effect of the present invention is achievable for the three-dimensional images other than the first image V1.

When plural three-dimensional images obtained by imaging the same tubular organ of the same patient at the same time are obtained, a probability of occurrence of similar organ deformation at the same position in the plural three-dimensional images is high, as described already. Therefore, when automatic extraction of an organ in one of the three-dimensional images succeeds, the probability that automatic extraction by using the same method succeeds also in the other three-dimensional images is high. Hence, for example, as illustrated in S01 through S08, processing for automatically extracting an organ is performed on one image, and whether correction information about the organ is present or not is obtained. When the correction information is present, an air region in another three-dimensional image (second image) corresponding to organ region P in the one three-dimensional image (first image) is extracted, as organ region Q in the other three-dimensional image, in a similar manner to processing in S08 through S10 in each of the aforementioned embodiments. When the correction information is not present, the method for automatically extracting an organ applied to the one three-dimensional image may be applied to another three-dimensional image, and an organ region in the other three-dimensional image may be extracted. When plural methods for extracting an organ are appropriately switched based on whether correction information is present or not in this manner, it is possible to utilize, based on whether correction information is present or not, a user's judgment about whether an organ region is successfully extracted from the first image or not, and to accurately and easily extract an organ region from another three-dimensional image by using an appropriate organ extraction method.

In each of the aforementioned embodiments, processing for extracting an air region from first image V1 or second image V2 may be performed at an external apparatus other than the diagnosis assistance apparatus 1. Further, diagnosis assistance apparatus 1 may be configured to obtain a result of extracting an air region from first image V1 or second image V2. Further, any known method for extracting an air region may be adopted to extract the air region from first image V1 and second image V2. Further, when an air region is extracted from second image V2, processing for extracting the air region from second image V2 may be performed in arbitrary timing as long as the processing is performed before processing for extracting an organ from second image V2 (S10) is performed. Further, the order of processing for extracting the air region illustrated in S02 and processing for extracting the organ illustrated in S03 may be switched from each other. Further, processing for matching corresponding positions between first image V1 and second image V2 illustrated in S09 may be performed in arbitrary timing as long as the processing is performed before the processing for extracting the organ region from second image V2 illustrated in S10.

Further, various known automatic extraction methods adopted in CAD (Computer-aided Diagnosis) system may be used to automatically extract an organ region.

First image V1 and second image V2 may be imaged by the same modality, or by different modalities.

In explanation of each of the aforementioned embodiments, a mouse is used as an example of an input device. Needless to say, other input devices may be adopted. For example, a touch panel may be adopted instead of the display 3 so that an operation input on the panel is performable.

The present invention is not limited to the aforementioned embodiments. The present invention may be used to assist diagnosis on tubular structure living tissue other than the large intestine. Various modifications are possible without departing from the gist of the present invention.

What is claimed is:

1. A diagnosis assistance apparatus comprising:
   an image obtainment unit that obtains each of a first image and a second image obtained by imaging a region including the same tubular structure organ of the same subject at the same time;
   an organ region extraction unit that extracts an organ region of the organ from the first image;
   a display control unit that makes the extracted organ region displayed on a display screen;
   a correction information obtainment unit that receives an input of an air region included in the first image and an input of exceeding or lacking portion information representing that the air region is a lacking portion or an exceeding portion of the organ, and obtains the received air region and the received exceeding or lacking portion information corresponding to the air region, as correction information; and
   a position matching unit that calculates position-matching information that correlates corresponding positions to each other between the first image and the second image,
   wherein the organ region extraction unit corrects, based on the correction information, the organ region extracted from the first image by adding a portion corresponding to the lacking portion or by deleting the exceeding portion, and extracts, based on the position-matching information, at least an air region in the second image located at a position corresponding to the air region corresponding to the correction information, as a part of the organ region in the second image.

2. The diagnosis assistance apparatus, as defined in claim 1, wherein the organ region extraction unit extracts, based on the position-matching information, an air region in the second image located at a position corresponding to the corrected organ region, as the organ region in the second image.

3. The diagnosis assistance apparatus, as defined in claim 2, wherein the position matching unit matches corresponding positions with each other between the first image and the second image by using a non-rigid registration method, and wherein the organ region extraction unit obtains a plurality of air regions from the second image, and extracts at least one of the plurality of air regions in the second image, each including a region overlapping, by a predetermined ratio or higher, with the corrected organ region in the first image when corresponding positions are matched with each other between the first image and the second image based on the position-matching information, as the organ region in the second image.

4. The diagnosis assistance apparatus, as defined in claim 2, wherein the position matching unit generates a first graph structure representing the corrected organ region, and which is defined by a plurality of nodes and at least one edge connecting the plurality of nodes, and obtains a plurality of air regions included in the second image, and generates a plurality of second graph structures representing the plurality of air regions in the second image, respectively, and each of which is defined by a plurality of nodes and at least one edge connecting the plurality of nodes, and wherein the organ region extraction unit identifies at least one of the plurality of second graph structures in which a predetermined ratio or higher of the plurality of nodes constituting each of the plurality of second graph structures is located at a position or positions corresponding to a node or nodes included in the first graph structure, and extracts at least one of the air regions corresponding to the identified at least one of the plurality of second graph structures, as the organ region in the second image.

5. The diagnosis assistance apparatus, as defined in claim 1, wherein the display control unit obtains the air region in the first image, and makes the first image displayed on the display screen in such a manner that the extracted organ region and the air region in the first image are distinguishable from each other.

6. The diagnosis assistance apparatus, as defined in claim 1, wherein the correction information obtainment unit receives specification of a position in an air region included in the first image, and obtains, as the air region, a continuous air region including the specified position.

7. The diagnosis assistance apparatus, as defined in claim 1, wherein the tubular structure organ is intestines.

8. A diagnosis assistance method performed by a diagnosis assistance apparatus, the method comprising of:
an image obtainment step of obtaining each of a first image and a second image obtained by imaging a region including the same tubular structure organ of the same subject at the same time;
an organ region extraction step of extracting an organ region of the organ from the first image;
a display control step of making the extracted organ region displayed on a display screen;
a correction information obtainment step of receiving an input of an air region included in the first image and an input of exceeding or lacking portion information representing that the air region is a lacking portion or an exceeding portion of the organ, and obtaining the received air region and the received exceeding or lacking portion information corresponding to the air region, as correction information;
a position matching step of calculating position-matching information that correlates corresponding positions to each other between the first image and the second image;
a correction step of correcting, based on the correction information, the organ region extracted from the first image by adding a portion corresponding to the lacking portion or by deleting the exceeding portion; and
an extraction step of extracting, based on the position-matching information, at least an air region in the second image located at a position corresponding to the air region corresponding to the correction information, as a part of the organ region in the second image.

9. A non-transitory computer-readable storage medium stored therein a diagnosis assistance program for causing a computer to perform:
an image obtainment step of obtaining each of a first image and a second image obtained by imaging a region including the same tubular structure organ of the same subject at the same time;
an organ region extraction step of extracting an organ region of the organ from the first image;
a display control step of making the extracted organ region displayed on a display screen;
a correction information obtainment step of receiving an input of an air region included in the first image and an input of exceeding or lacking portion information representing that the air region is a lacking portion or an exceeding portion of the organ, and obtaining the received air region and the received exceeding or lacking portion information corresponding to the air region, as correction information;
a position matching step of calculating position-matching information that correlates corresponding positions to each other between the first image and the second image;
a correction step of correcting, based on the correction information, the organ region extracted from the first image by adding a portion corresponding to the lacking portion or by deleting the exceeding portion; and
an extraction step of extracting, based on the position-matching information, at least an air region in the second image located at a position corresponding to the air region corresponding to the correction information, as a part of the organ region in the second image.

* * * * *